July 15, 1952
R. E. WEILER ET AL
2,603,062
VARIABLE AREA JET NOZZLE
Filed Sept. 30, 1949
2 SHEETS—SHEET 1
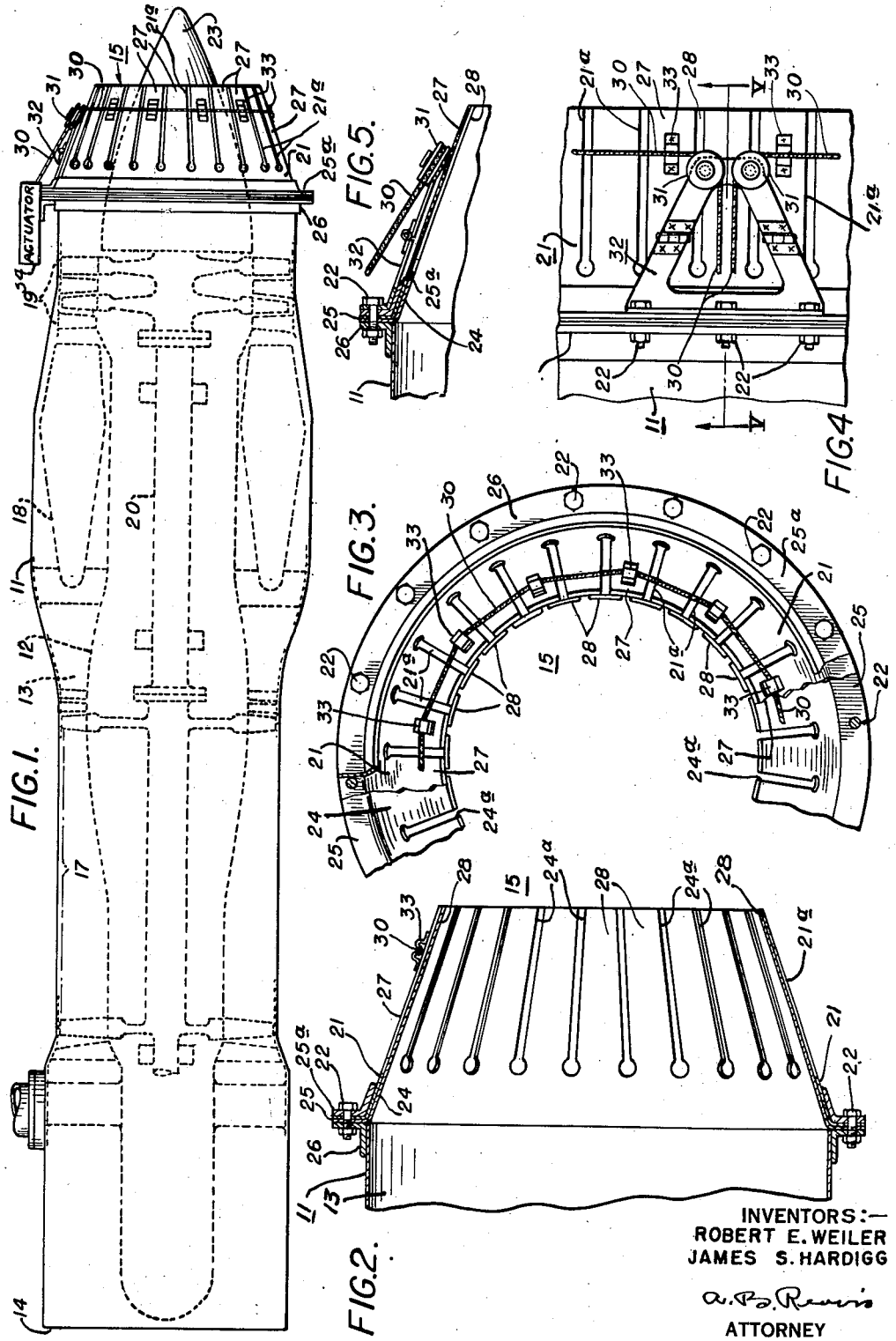
INVENTORS:—
ROBERT E. WEILER
JAMES S. HARDIGG
ATTORNEY

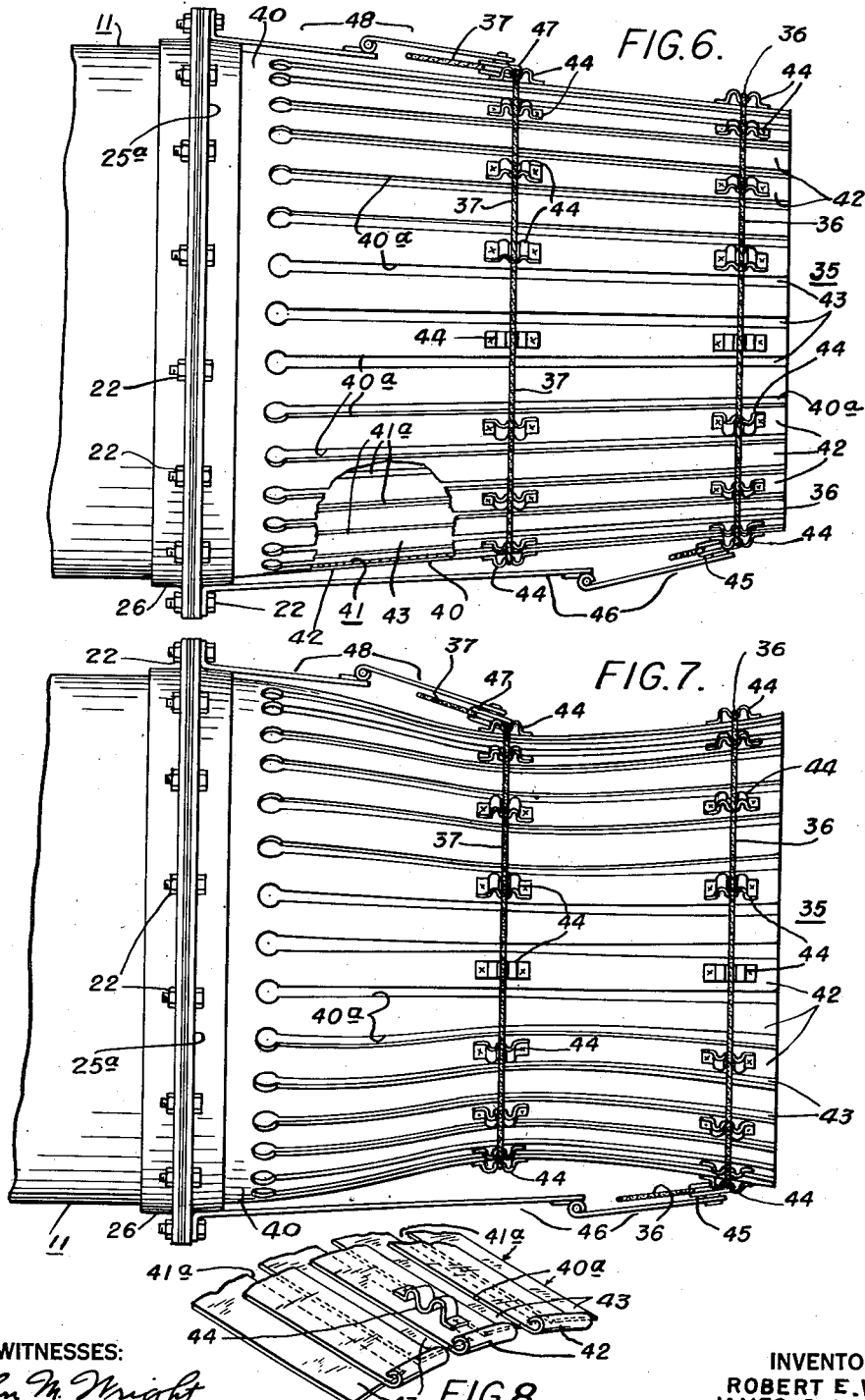

Patented July 15, 1952

2,603,062

UNITED STATES PATENT OFFICE 2,603,062

VARIABLE AREA JET NOZZLE

Robert E. Weiler, Prospect Park, and James S. Hardigg, Swarthmore, Pa., assignors to Westinghouse Electric Corporation, East Pittsburgh, Pa., a corporation of Pennsylvania Application September 30, 1949, Serial No. 118,906

2 Claims. (Cl. 60—35.55)

This invention relates to nozzles of the variable flow area type, and more particularly to adjustable nozzle structure for a turbojet, athodyd or the like.

It has been proposed to provide means for varying the flow area of a motive fluid discharge nozzle, such as the nozzle of an aviation turbojet engine, to promote broader operational range, to effect more efficient operation under changing conditions, or to minimize fuel consumption.

A general object of the present invention is to provide an improved adjustable nozzle structure for a turbojet engine or the like, including means selectively operable to establish a variable annular orifice.

Another object of the invention is to devise a nozzle means, readily operative, to define a variable annular orifice of any desired flow area, without use of a movable central plug or hinged closure lids which might involve structural and cooling problems and might effect undesired changes in the ideal discharge flow pattern.

A further object of the invention is the provision of variable nozzle apparatus operative to maintain a generally conical gas flow path for affording optimum nozzle efficiency over a wide range of jet velocities.

Still another object is to provide an adjustable nozzle structure which may be utilized to establish either a conical nozzle, or a converging-diverging nozzle exhibiting favorable characteristics with supersonic exit velocities.

Features of construction relating to the invention, as hereinafter more fully described, include the use of a pair of nested frusto-conical wall members having longitudinally disposed flexible leaves arranged in staggered, overlapping relation, together with cable means encompassing the outer leaves for applying the desired adjusting force.

These and other objects are effected by the invention as will be apparent from the following description and claims taken in connection with the accompanying drawing, forming a part of this application, in which:

Fig. 1 is a diagrammatic elevational view of a typical aviation gas turbine power plant equipped with an adjustable nozzle constructed in accordance with the invention;

Fig. 2 is an enlarged detail sectional view of the nozzle shown in Fig. 1;

Fig. 3 is a fragmentary end view of the nozzle shown in Fig. 2;

Fig. 4 is a fragmentary enlarged detail plan view of a portion of the actuating cable and carrier apparatus of the nozzle shown in Fig. 1;

Fig. 5 is a fragmentary sectional view taken along the line V—V of Fig. 4;

Fig. 6 is an elevational view of a nozzle structure embodying the invention in a different form;

Fig. 7 is a view similar to Fig. 6 illustrating the nozzle adjusted for converging-diverging flow; and Fig. 8 is a fragmentary perspective view of the terminal portions of flexible leaves of the improved nozzle, illustrating a modified construction.

Referring now to Fig. 1 of the drawing, the typical gas turbine engine illustrated therein comprises an outer substantially cylindrical casing structure 11 having mounted therein a sectional core structure 12 forming an annular flow communication generally indicated at 13, which extends longitudinally through the engine from a frontal air intake duct 14 to a rearwardly disposed discharge nozzle 15. The operating elements of the engine are disposed in axial alignment within the casing structure and include an axial-flow compressor 17, annular combustion apparatus 18, and a turbine 19, the rotor of which is connected to the rotor of the compressor through the medium of a shaft 20, which is journaled in suitable bearings mounted in the core structure 12. The general principles of operation of such a power plant are well known, and may briefly be summarized as follows: Air entering the intake duct 14 is compressed by the compressor 17, from which it is delivered to the combustion apparatus 18 for supporting combustion of fuel supplied thereto by way of suitable atomizing nozzles, and the resultant hot motive gases are then expanded through the turbine 19 and finally discharged to atmosphere by way of nozzle 15, establishing a propulsive thrust.

As best shown in Fig. 2 of the drawing, the end of the power plant having the discharge nozzle 15 further comprises an outer frusto-conical wall or section 21 of the outer casing structure 11, within which, if desired, a conical core piece 23 may be supported through the medium of suitable radially disposed struts (not shown). Closely fitted within the section 21, as best shown in Figs. 2 and 3, is a frusto-conical inner wall or section 24, the rearmost portion of which defines the nozzle opening 15, and the larger end of which has an annular flange 25 which is suitably secured, as by bolts 22, between a complementary flange 25a carried by the outer extension 21 and an annular flange 26 carried on the casing structure 11. According to the invention, both the outer section 21 and the inner section 24 have formed therein a plurality of equally spaced notches or slots 21a and 24a, which provide longitudinally disposed flexible leaves 27 on the outer section that overlap the slots between similar leaves 28 formed on the inner section (see Fig. 3). It will be understood that the inherent resiliency of the overlapped leaves 27 and 28 will tend to maintain them in a normal position, as shown in Fig. 2, forming substantially the preferred frusto-conical contour and annular flow area for the nozzle 15 as a whole. On the other hand, the leaves are sufficiently flexible to respond to a radially inwardly directed or constricting force, and can thus be bent inwardly when it is desired to reduce the flow area of the nozzle, as hereinafter explained. It will be noted that the slots 21a and 24a are longitudinally formed throughout a substantial extent of the outer and inner sections, respectively, providing leaves 27 and 28 preferably exceeding one-half the axial length of the nozzle structure.

For effecting the desired degree of convergence of the cooperating flexible leaves 27 and 28, there is provided a flexible annular ferrule member or cable 30, which is disposed in encompassing engagement with the outer leaves 27, and which has its opposite end portions operatively supported on a pair of spaced pulleys 31. The pulleys 31 may be rotatably mounted on a suitable stationary support, such as a rearwardly projecting hinged bracket 32 carried by the engine casing structure. In order that the cable 30 may be restrained from displacement relative to the canted leaves 27, U-shaped elements or channels 33 are mounted on a number of the leaves, for receiving the cable. Any suitable mechanism, indicated generally at 34 in Fig. 1, may be provided to vary the tension force on the cable 30, so that the leaves 27 and 28 can be flexed inwardly and set in a relatively converging position, for example, when it is desired to reduce the flow area of the jet nozzle. By subsequently releasing the cable 30, the leaves 27 and 28 will be permitted to expand or flex outwardly toward the normal position shown in Fig. 2, in response to the pressure of motive fluid vented through the nozzle during operation of the turbojet engine.

Referring to Figs. 6 and 7, the invention is therein disclosed in an alternative form, in which a nozzle structure 35, preferably having somewhat greater axial length than the nozzle 15 already described, is provided in association with two cables 36 and 37 for operation to effect variations in the axial conformation or flow pattern of the nozzle as well as preselection of the flow area.

It has been demonstrated that as the flight speed of a jet propelled aircraft is increased, the velocity of the jet issuing from the nozzle also rises and may enter the supersonic range. For nozzle exit velocities at a Mach number in excess of about 1.3, or when the nozzle jet velocity is greater than about 1.3 times the jet acoustic velocity, a converging-diverging nozzle may exhibit more efficient operational characteristics than a simple converging nozzle. According to the invention, the nozzle 35 is constructed and arranged to render available either a variable area converging nozzle, illustrated in Fig. 6, or a variable area converging-diverging nozzle as shown in Fig. 7.

As shown in Fig. 6, an outer annular section 40 and an inner section 41 nested therein are bolted to flange 26 of the casing structure 11 of the power plant. Each section has longitudinally extending slots 40a and 41a, respectively, forming a plurality of outer flexible leaves 42 and overlapping inner leaves 43. For actuating the adjustable nozzle structure thus provided, the cable 36 is wrapped about the leaves 42 adjacent the discharge opening of the nozzle 35, and may be operatively engaged in suitable channels 44 carried by certain of the leaves. The cable 37 is similarly engaged in channels 44 and mounted in encompassing relation about the leaves 42 along a plane intermediate the cable 36 and the forward flanged end of the nozzle assembly. The ends of the rearmost cable 36 may be passed over suitable pulleys 45 mounted on a hinged carrier structure 46 supported from the casing 11. In like manner, the ends of the cable 37 are adapted to engage pulleys 47 that are mounted on a suitable stationary carrier structure 48.

It will be understood that each of the cables 36 and 37 is arranged for application of any desired tensioning force on the associated flexible leaves of the nozzle assembly, as hereinbefore explained in connection with the cable 30 shown in Fig. 1. Thus, if it is desired to effect a reduction in the flow area of the nozzle 35, without departing from the generally frusto-conical form shown in Fig. 6, both cables will be tightened simultaneously to maintain the desired relationship. If it is desired to effect a change in the form of the nozzle to the converging-diverging shape illustrated in Fig. 8 for use at supersonic velocities, the intermediate cable 37 will be actuated to force inwardly the central portions of the flexible leaves 42 and 43 while the end cable 36 may be released to a limited extent for permitting exhaust gas pressure to expand the outer end of the nozzle assembly.

The terminal ends of the outer leaves 42 may, as shown in Fig. 8, be curved outwardly to afford adequate stiffness to the thin stock from which the nozzle sections are made, and to ensure maintenance of the circular nozzle exit opening.

From the foregoing, it will be apparent that a nozzle structure constructed and arranged in accordance with the invention may be built from material of relatively light weight, and will be readily operative to effect variations in nozzle form and flow area in increments small enough to facilitate accurate adjustment thereof promoting optimum engine performance under most service conditions. The basically conical shape of the improved nozzle, symmetric in cross section, renders the assembly readily useful in association with either engine equipment of existing form or power plants of advanced design.

While the invention has been shown in several forms, it will be obvious to those skilled in the art that it is not so limited, but is susceptible of various other changes and modifications without departing from the spirit thereof.

What is claimed is:

1. Motive fluid discharge nozzle apparatus comprising substantially cylindrical casing structure terminating in double frusto-conical retractile wall sections forming a nozzle opening, both of said wall sections having staggered axial slits formed therein through more than half the longitudinal extent of said wall sections for providing a plurality of overlapping flexible elongated leaves, a first retractile cable operatively looped about said leaves at an annulus intermediate the ends of said wall sections, and a second retractile cable operatively looped about said leaves adjacent the free ends thereof, said cables being independently operative to vary the flow area and the axial conformation of said nozzle.

2. Motive fluid discharge nozzle apparatus comprising substantially cylindrical casing structure terminating in double frusto-conical retractile wall sections forming a nozzle opening, both of said wall sections having staggered axial slits formed therein through more than half the longitudinal extent of said wall sections for providing a plurality of overlapping flexible elongated leaves, a first retractile cable operatively looped about said leaves at an annulus intermediate the ends of said wall sections, and a second retractile cable operatively looped about said leaves adjacent the free ends thereof, said first cable being operative at will to force radially inwardly the central portion of said leaves while said second cable is operated to effect relative outward movement of the free ends thereof under the pressure of discharging motive fluid, for thereby providing a converging-diverging nozzle passage.

ROBERT E. WEILER.
JAMES S. HARDIGG.

REFERENCES CITED

The following references are of record in the file of this patent:

UNITED STATES PATENTS

| Number | Name | Date |
| --- | --- | --- |
| 186,310 | Curtis | Jan. 16, 1877 |
| 397,629 | Butler | Feb. 12, 1889 |
| 1,340,120 | Peck | May 11, 1920 |
| 2,462,953 | Eaton et al. | Mar. 1, 1949 |

FOREIGN PATENTS

| Number | Country | Date |
| --- | --- | --- |
| 586,571 | Great Britain | Mar. 24, 1947 |
| 588,501 | Great Britain | May 27, 1947 |